US011255266B2

(12) United States Patent
Pascu

(10) Patent No.: US 11,255,266 B2
(45) Date of Patent: Feb. 22, 2022

(54) RECUPERATED CYCLE ENGINE

(71) Applicant: United Technologies Corporation, Farmington, CT (US)

(72) Inventor: Victor Pascu, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/827,051

(22) Filed: Mar. 23, 2020

(65) Prior Publication Data

US 2020/0362756 A1    Nov. 19, 2020

Related U.S. Application Data

(60) Provisional application No. 62/847,419, filed on May 14, 2019.

(51) Int. Cl.
| | | |
|---|---|---|
| *F02C 7/10* | (2006.01) | |
| *F02C 3/14* | (2006.01) | |
| *F01D 25/30* | (2006.01) | |
| *F02C 3/05* | (2006.01) | |
| *F02C 7/36* | (2006.01) | |

(52) U.S. Cl.
CPC ............... *F02C 7/10* (2013.01); *F02C 3/145* (2013.01); *F01D 25/30* (2013.01); *F02C 3/05* (2013.01); *F02C 7/36* (2013.01)

(58) Field of Classification Search
CPC .... F02C 7/08; F02C 7/10; F02C 3/145; F02K 3/068
See application file for complete search history.

(56) References Cited

U.S. PATENT DOCUMENTS

| | | | | |
|---|---|---|---|---|
| 2,162,956 A | * | 6/1939 | Lysholm | F02C 7/08 60/767 |
| 2,454,738 A | * | 11/1948 | Hawthorne | F02C 3/073 60/269 |
| 2,540,526 A | * | 2/1951 | Howell | F02C 3/145 60/39.37 |
| 2,548,975 A | * | 4/1951 | Hawthorne | F02C 3/073 60/268 |

(Continued)

FOREIGN PATENT DOCUMENTS

| | | |
|---|---|---|
| EP | 1612371 A1 | 1/2006 |
| GB | 592615 A | 9/1947 |

OTHER PUBLICATIONS

Extended European Search Report for European Patent Application No. 20174487.7, dated Oct. 15, 2020, 8 pages.

(Continued)

*Primary Examiner* — Gerald L Sung
(74) *Attorney, Agent, or Firm* — Kinney & Lange, P.A.

(57) ABSTRACT

A gas turbine engine includes a rotatable first shaft, a first disk connected to the first shaft, a second disk connected to the first shaft, a combustor radially outward from the first disk and the second disk, and a heat exchanger connected to the combustor aft of the second disk. The first disk includes a row of low pressure compressor blades and a row of high pressure turbine blades connected to a radially outer end of the row of low pressure compressor blades. The second disk includes a row of high pressure compressor blades and a row of low pressure turbine blades connected to a radially outer end of the row of high pressure compressor blades.

9 Claims, 2 Drawing Sheets

(56) References Cited

U.S. PATENT DOCUMENTS

| | | | |
|---|---|---|---|
| 2,721,445 A * | 10/1955 | Giliberty | F02C 3/145 |
| | | | 60/266 |
| 3,116,604 A | 1/1964 | Holl | |
| 3,186,166 A * | 6/1965 | Grieb | F02C 3/073 |
| | | | 60/792 |
| 3,404,853 A | 10/1968 | Miller | |
| 3,589,132 A | 6/1971 | Du Pont | |
| 3,818,695 A | 6/1974 | Rylewski | |
| 3,965,699 A | 6/1976 | Bracken, Jr. | |
| 4,086,760 A | 5/1978 | Chute | |
| 4,141,212 A | 2/1979 | Koschier | |
| 4,307,568 A | 12/1981 | Huller et al. | |
| 5,685,156 A | 11/1997 | Willis et al. | |
| 5,855,112 A | 1/1999 | Bannai et al. | |
| 6,092,361 A | 7/2000 | Romani | |
| 6,170,251 B1 | 1/2001 | Skowronski et al. | |
| 6,293,338 B1 | 9/2001 | Chapman et al. | |
| 6,634,176 B2 | 10/2003 | Rouse et al. | |
| 6,711,889 B2 | 3/2004 | Kuo et al. | |
| 6,832,470 B2 | 12/2004 | Dewis | |
| 6,837,419 B2 | 1/2005 | Ryan | |
| 6,886,341 B2 | 5/2005 | Inoue | |
| 7,124,572 B2 | 10/2006 | Aycock et al. | |
| 7,775,044 B2 | 8/2010 | Julien et al. | |
| 8,176,725 B2 | 5/2012 | Norris et al. | |
| 8,221,073 B2 | 7/2012 | Macfarlane et al. | |
| 9,995,216 B1 | 6/2018 | Rez et al. | |
| 10,233,838 B2 | 3/2019 | Vick | |
| 2005/0193713 A1 | 9/2005 | Kovasity et al. | |
| 2006/0086078 A1* | 4/2006 | Paul | F02C 3/073 |
| | | | 60/226.1 |
| 2006/0123793 A1 | 6/2006 | Alkabie | |
| 2007/0234733 A1 | 10/2007 | Harris et al. | |
| 2009/0282804 A1 | 11/2009 | Smalley et al. | |
| 2010/0232953 A1 | 9/2010 | Anderson et al. | |
| 2012/0110978 A1* | 5/2012 | Paul | F02K 3/068 |
| | | | 60/203.1 |
| 2013/0139515 A1* | 6/2013 | Schlak | F01D 15/02 |
| | | | 60/772 |
| 2014/0165582 A1 | 6/2014 | Pascu et al. | |
| 2016/0237894 A1 | 8/2016 | Kupratis et al. | |
| 2017/0306841 A1 | 10/2017 | Skertic | |

OTHER PUBLICATIONS

International Search Report and Written Opinion, dated Mar. 17, 2014, for PCT Application No. PCT/US2013/073503, 12 pages.
International Preliminary Report on Patentability for PCT Application No. PCT/US2013/073503, dated Jun. 23, 2015, 10 pages.

* cited by examiner

RECUPERATED CYCLE ENGINE

CROSS-REFERENCE TO RELATED APPLICATION(S)

This application claims the benefit of U.S. Provisional Application No. 62/847,419 filed May 14, 2019 for "RECUPERATED CYCLE ENGINE," which is fully incorporated by reference herein.

BACKGROUND

The present disclosure relates to gas turbine engines, and in particular, to recuperated cycle gas turbine engines.

Gas turbine engines ignite compressed air in a combustor to produce high pressure, high temperature airflow that rotates a turbine in order to drive rotation of a shaft and a compressor attached to the shaft. As such, the compressor is able to provide the compressed air to the combustor. Typically, air flows through the gas turbine engine in an axial direction, moving sequentially through the compressor, the combustor, and the turbine. As a result, gas turbine engines can be large, heavy, and expensive.

SUMMARY

A gas turbine engine includes a rotatable first shaft, a first disk connected to the first shaft, a second disk connected to the first shaft, a combustor radially outward from the first disk and the second disk, and a heat exchanger connected to the combustor aft of the second disk. The first disk includes a row of low pressure compressor blades and a row of high pressure turbine blades connected to a radially outer end of the row of low pressure compressor blades. The second disk includes a row of high pressure compressor blades and a row of low pressure turbine blades connected to a radially outer end of the row of high pressure compressor blades.

A gas turbine engine includes a rotatable first shaft, a compressor section forming an innermost section, a combustor section forming an outermost section, a turbine section forming an intermediate section, and a heat exchanger connected to an aft end of the combustor section. The compressor section, the combustor section, and the turbine section are concentric sections surrounding the first shaft. Airflow moves forward to aft through the compressor section to the heat exchanger, moves radially outward through the heat exchanger to the combustor section, moves aft to forward through the combustor section, and moves forward to aft through the turbine section and the heat exchanger.

DETAILED DESCRIPTION

In general, the present disclosure describes a recuperated cycle gas turbine engine that includes a disk having one row of turbine blades connected to one row of compressor blades and a heat exchanger aft of the row of compressor blades and upstream of a combustor to allow for heat transfer between compressor exit airflow and turbine exit airflow, resulting in increased efficiency, a compact, lighter, simplified, more cost-effective configuration, and reduced engine signature. One or more of a disk having only a single row of compressor blades, a row of compressor vanes, and a row of turbine vanes can also be included to further increase the efficiency of the gas turbine engine.

Figure 1:
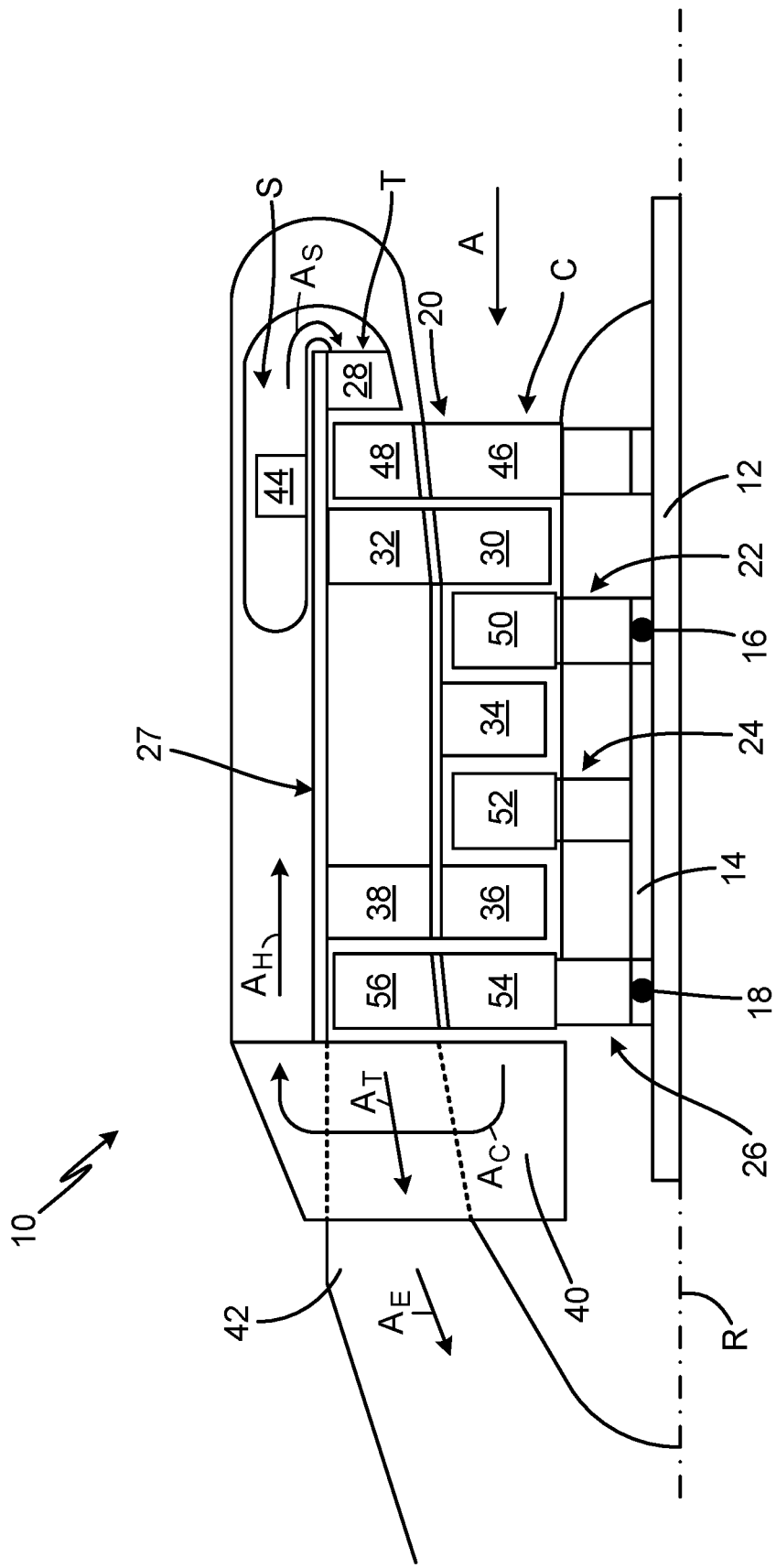
FIG. 1 is a cross-sectional schematic view of an upper half of a gas turbine engine.

FIG. 1 is a cross-sectional schematic view of gas turbine engine 10. FIG. 1 shows the upper half of gas turbine engine 10 above axis of rotation R. The lower half of gas turbine engine 10 is symmetrical to the upper half along axis of rotation R. Gas turbine engine 10 includes first shaft 12, second shaft 14, bearing 16, bearing 18, disk 20, disk 22, disk 24, disk 26, static engine structure 27 (including row of turbine vanes 28, row of compressor vanes 30, inter-turbine strut 32, row of compressor vanes 34, row of compressor vanes 36, and row of turbine vanes 38), heat exchanger 40, exhaust nozzle 42, and combustor 44. Disk 20 has row of low pressure compressor blades 46 and row of high pressure turbine blades 48. Disk 22 has row of high pressure compressor blades 50. Disk 24 has row of high pressure compressor blades 52. Disk 26 has row of high pressure compressor blades 54 and row of low pressure turbine blades 56.

First shaft 12 is the main shaft of gas turbine engine 10. First shaft 12 rotates around axis of rotation R at a center of gas turbine engine 10. Second shaft 14 is connected to first shaft 12 via bearing 16 and bearing 18. Bearing 16 is connected to second shaft 14 near a forward end of second shaft 14, and bearing 18 is connected to second shaft 14 near an aft end of second shaft 14. Disk 20 is directly connected to first shaft 12 at a forward end of first shaft 12. Disk 20 makes up a first stage of gas turbine engine 10. In alternate embodiments, gas turbine engine 10 may have any number of disks 20. Disk 22 is aft of disk 20 and connected to second shaft 14. Thus, disk 22 is connected to first shaft 12 via second shaft 14. Disk 24 is aft of disk 22 and connected to second shaft 14. Thus, disk 24 is connected to first shaft 12 via second shaft 14. Disk 26 is aft of disk 24 and connected to second shaft 14. Thus, disk 26 is connected to first shaft 12 via second shaft 14. Disk 22, disk 24, and disk 26 make up a second stage of gas turbine engine 10. In alternate embodiments, gas turbine engine 10 may not include second shaft 14 and disks 22, 24, and 26 may be directly connected to first shaft 12. Static engine structure 27 surrounds first shaft 12 and second shaft 14 and is stationary. Row of turbine vanes 28 is part of static structure 27 forward of disk 20. Row of compressor vanes 30 is part of static structure 27 between disk 20 and disk 22. Inter-turbine strut 32 is part of static structure 27 between disk 20 and disk 22 and radially outward from row of compressor vanes 30. Row of compressor vanes 34 is part of static structure 27 between disk 22 and disk 24. Row of compressor vanes 36 is part of static structure 27 between disk 24 and disk 26. Row of turbine vanes 38 is part of static structure 27 between disk 24 and disk 26 and radially outward from row of compressor vanes 36. As such, row of turbine vanes 38 is forward of disk 26. Heat exchanger 40 is attached to static structure 27 aft of disk 26. Heat exchanger 40 is also static. Heat exchanger 40 is optimized based on the configuration and application of gas turbine engine 10. Exhaust nozzle 42 is connected to an aft end of heat exchanger 40. Combustor 44 is connected to heat exchanger 40 forward of heat exchanger 40 and is radially outward from disks 20, 22, 24, and 26. Combustor 44 is a reverse flow combustor.

Disk 20 has row of low pressure compressor blades 46 and row of high pressure turbine blades 48 connected to a radially outer end of row of low pressure compressor blades 46. Row of low pressure compressor blades 46 forms a low pressure compressor. Row of high pressure turbine blades 48 forms a high pressure turbine. Disk 22 has row of high pressure compressor blades 50. Disk 24 has row of high pressure compressor blades 52. Disk 26 has row of high pressure compressor blades 54 and row of low pressure turbine blades 56 connected to a radially outer end of row of high pressure compressor blades 54. Row of high pressure compressor blades 50, row of high pressure compressor blades 52, and row of high pressure compressor blades 54 form a high pressure compressor. Row of low pressure turbine blades 56 forms a low pressure turbine. Row of low pressure compressor blades 46, row of compressor vanes 30, row of high pressure compressor blades 50, row of compressor vanes 34, row of high pressure compressor blades 52, row of compressor vanes 36, and row of high pressure compressor blades 54 are axially aligned and form compressor section C. Row of turbine vanes 28, row of high pressure turbine blades 48, inter-turbine strut 32, row of turbine vanes 38, and row of low pressure turbine blades 56 are axially aligned and form turbine section T. Row of turbine vanes 28, row of high pressure turbine blades 48, inter-turbine strut 32, row of turbine vanes 38, and row of low pressure turbine blades 56 are radially outward from row of low pressure compressor blades 46, row of compressor vanes 30, row of high pressure compressor blades 50, row of compressor vanes 34, row of high pressure compressor blades 52, row of compressor vanes 36, and row of high pressure compressor blades 54. As such, turbine section T is radially outward from compressor section C. Combustor 44 forms combustor section S, which is radially outward from turbine section T. Thus, gas turbine engine 10 has three concentric sections surrounding first shaft 12. Compressor section C, turbine section T, and combustor section S are concentric with compressor section C being the innermost section, turbine section T being the intermediate section, and combustor section S being the outermost section.

Airflow A enters a forward end of gas turbine engine 10 at row of low pressure compressor blades 46 where airflow A is compressed and the pressure of airflow A is increased. Next, airflow A moves in an aft direction and is further compressed at each of row of compressor vanes 30, row of high pressure compressor blades 50, row of compressor vanes 34, row of high pressure compressor blades 52, row of compressor vanes 36, and row of high pressure compressor blades 54, increasing the pressure of airflow A. Airflow A flowing aft of row high pressure compressor blades 54 becomes compressor exit airflow $A_C$. Compressor exit airflow $A_C$ is a cold or cooler stream of airflow that enters heat exchanger 40. As such, airflow A moves forward to aft of gas turbine engine 10 through compressor section C to heat exchanger 40. Compressor exit airflow $A_C$ moves radially outward through heat exchanger 40 to combustor section S. Compressor exit airflow $A_C$ is heated in heat exchanger 40.

Airflow exiting heat exchanger 40 becomes heated airflow $A_H$. Heated airflow $A_H$ flows in a forward direction to enter combustor 44. Combustor 44 injects fuel into heated airflow $A_H$ to ignite heated airflow $A_H$ and further increase the temperature of heated airflow $A_H$. Thus, heated airflow $A_H$ moves aft to forward of gas turbine engine 10 through combustor section S. The airflow exiting combustor 44 becomes high temperature airflow $A_S$ and flows radially inward, turning 180 degrees to flow in an aft direction past row of turbine vanes 28. High temperature airflow $A_S$ continues to move in an aft direction through row of high pressure turbine blades 48. High temperature airflow $A_S$ expands while moving past row of high pressure turbine blades 48, driving rotation of first disk 20. As first disk 20 is rotated at row of high pressure turbine blades 48, row of low pressure compressor blades 46 and first shaft 12 are also rotated. High temperature airflow $A_S$ then moves through inter-turbine strut 32 where high temperature airflow $A_S$ is straightened to prevent swirling and improve the entry angle of high temperature airflow $A_S$ into row of low pressure turbine blades 52. Next, high temperature airflow $A_S$ flows through row of turbine vanes 38 and row of low pressure turbine blades 56, expanding to drive rotation of disk 26. As disk 26 is rotated at row of low pressure turbine blades 56, row of high pressure compressor blades 54 and second shaft 14 are also rotated. Because disks 24 and 22 are connected to second shaft 14, disks 24 and 22 are rotated. Airflow exiting row of low pressure turbine vanes 56 becomes turbine exit airflow $A_T$. Turbine exit airflow $A_T$ is a hot stream of airflow that enters heat exchanger 40. As such, high temperature airflow $A_S$ moves forward to aft of gas turbine engine 10 through turbine section T and heat exchanger 40.

Heat from turbine exit airflow $A_T$ is transferred to compressor exit airflow $A_C$ in heat exchanger 40 to produce higher temperature heated airflow $A_H$ to supply to combustor 44 and lower temperature exit airflow $A_E$. Airflow exiting heat exchanger 40 becomes exit airflow $A_E$ and exits gas turbine engine 10 at exhaust nozzle 42. As such, heat exchanger 40 accepts and directs compressor exit airflow $A_C$ to combustor 44 and turbine exit airflow $A_T$ to exhaust nozzle 42. Compressor exit airflow $A_C$ and turbine exit airflow $A_T$ are physically separated within heat exchanger 40. As exit airflow $A_E$ exits gas turbine engine 10, exit airflow $A_E$ produces thrust for gas turbine engine 10.

Typically, gas turbine engines have a compressor, a combustor, and a turbine in axial alignment. Because disk 22 includes row of low pressure compressor blades 46 and row of high pressure turbine blades 48 and disk 26 includes row of high pressure compressor blades 54 and row of low pressure turbine vanes 52, gas turbine engine 10 has axial and radial airflow directions and is smaller, more compact, and lighter in weight. Disks 22 and 24 having only rows of compressor blades 50 and 52, respectively, increases the pressure of airflow A, thereby increasing the efficiency of gas turbine engine 10. The efficiency of gas turbine engine 10 is further increased through incorporation of rows of compressor vanes 30, 34, and 36 and row of turbine vanes 38, which is possible because disk 20 has only one row of low pressure compressor blade 46 and disks 22, 24, and 26 have only one row of high pressure compressor blades 50, 52, and 54.

Additionally, heat from turbine exit airflow $A_T$ is recuperated and used to heat compressor exit airflow $A_C$ in heat exchanger 40 such that heated airflow $A_H$ enters combustor 44 and requires less fuel injection for ignition. As a result, gas turbine engine 10 has improved heat management and is more efficient and cost-effective. Gas turbine engine 10 also has improved heat management because airflow A moving through row of low pressure compressor blades 46 and rows of high pressure compressor blades 50, 52, and 54, or compressor section C, is not in contact with a heat source and turbine exit air $A_T$ is cooled by compressor exit airflow Ac in heat exchanger 40 before exiting gas turbine engine 10 as lower temperature exit airflow $A_E$, reducing engine signature.

Gas turbine engine 10 may have any number and combination of disks 20, 22, 24, and 26. For example, gas turbine engine 10 may not include disks 22 and 24. As such, compressor section C may include any combination of row of low pressure compressor blades 46, row of compressor vanes 30, row of high pressure compressor blades 50, row of compressor vanes 34, row of high pressure compressor blades 52, row of compressor vanes 36, and row of high pressure compressor blades 54. Likewise, turbine section T may include any combination of row of turbine vanes 28, row of high pressure turbine blades 48, inter-turbine strut 32, row of turbine vanes 38, and row of low pressure turbine blades 56. Additionally, in alternate embodiments, disk 22 may also include a row of turbine blades connected to a radially outer end of row of high pressure compressor blades 50. In further alternate embodiments, disk 24 may also include a row of turbine blades connected to a radially outer end of row of high pressure compressor blades 52.

Further, gas turbine engine 10 may have any number of stages. For example, gas turbine engine 10 may include a third stage including a row of intermediate compressor blades and/or a row of intermediate turbine blades. In alternate embodiments, gas turbine engine 10 may have multiple shafts 14, each shaft 14 connecting any number of disks 24 and/or 26 to first shaft 12. Gas turbine engine 10 will have a suitable number of disks and stages depending on the type and application of gas turbine engine 10.

Figure 2:
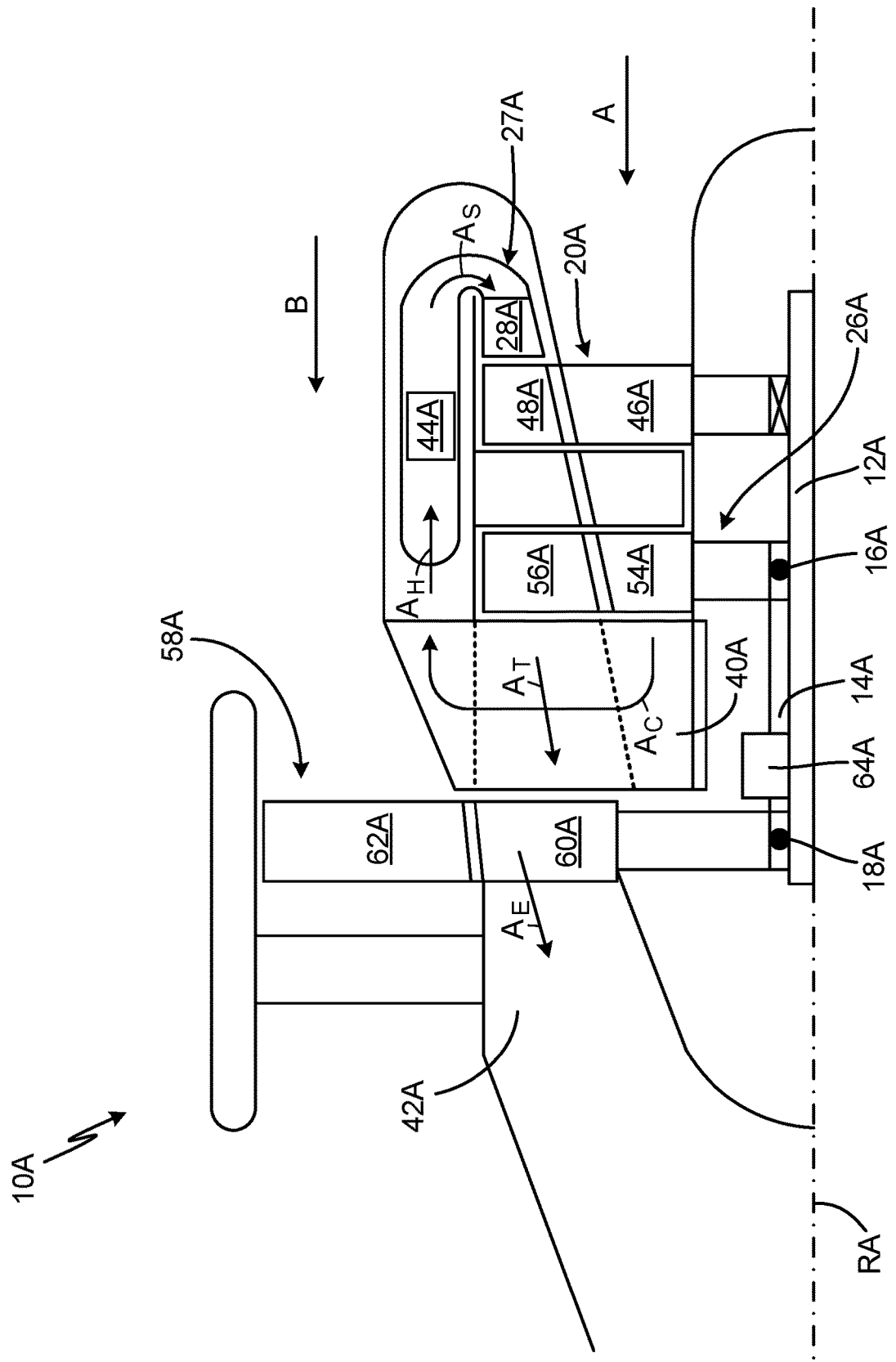
FIG. 2 is a cross-sectional schematic view of an upper half of a second embodiment of the gas turbine engine.

FIG. 2 is a cross-sectional schematic view of a second embodiment of an upper half of gas turbine engine 10A. Gas turbine engine 10A includes first shaft 12A, second shaft 14A, bearing 16A, bearing 18A, disk 20A, disk 26A, static engine structure 27A (including row of turbine vanes 28A), heat exchanger 40A, exhaust nozzle 42A, and combustor 44A. Disk 20A has row of low pressure compressor blades 46A and row of high pressure turbine blades 48A. Disk 26A has row of high pressure compressor blades 54A and row of low pressure turbine blades 56A. Gas turbine engine 10A also includes aft fan stage 58A, which includes row of free turbine blades 60A and row of aft fan blades 62A, and gear box 64A.

Gas turbine engine 10A has a similar structure and function as gas turbine engine 10 described in reference to FIG. 1, with the same components having the same reference numerals followed by A. However, gas turbine engine 10A does not include rows of compressor vanes, disks having rows of high pressure compressor blades, an inter-turbine strut, or a second row of turbine vanes, and has second shaft 14A connected to disk 26A and aft fan stage 58A, which includes row of free turbine blades 60A and row of aft fan blades 62A. Aft fan stage 58A has row of free turbine blades 60A and row of aft fan blades 62A connected to a radially outer end of row of free turbine blades 60A. Aft fan stage 58A is connected to second shaft 14A via bearing 18A and gear box 64A aft of heat exchanger 40A. In alternate embodiments, gas turbine engine 10A does not include gear box 64A.

Exit airflow $A_E$ exiting heat exchanger 40A flows through row of free turbine blades 60A, driving rotation of row of aft fan blades 62A along with bypass air B and producing additional thrust for gas turbine engine 10A. Aft fan stage 58A is easier to implement with gas turbine engine 10A, resulting in a simpler, more compact, and more efficient engine configuration.

Discussion of Possible Embodiments

The following are non-exclusive descriptions of possible embodiments of the present invention.

A gas turbine engine includes a rotatable first shaft; a first disk connected to the first shaft, the first disk including: a row of low pressure compressor blades; and a row of high pressure turbine blades connected to a radially outer end of the row of low pressure compressor blades; a second disk connected to the first shaft, the second disk including: a row of high pressure compressor blades; and a row of low pressure turbine blades connected to a radially outer end of the row of high pressure compressor blades; a combustor radially outward from the first disk and the second disk; and a heat exchanger connected to the combustor aft of the second disk.

The gas turbine engine of the preceding paragraph can optionally include, additionally and/or alternatively, any one or more of the following features, configurations and/or additional components:

A third disk connected to the first shaft between the first disk and the second disk, the third disk including a row of high pressure compressor blades.

A row of compressor vanes between the first disk and the third disk.

A fourth disk connected to the first shaft between the third disk and the second disk, the fourth disk including a row of high pressure compressor blades.

A row of compressor vanes between the third disk and the fourth disk.

A row of compressor vanes between the fourth disk and the second disk.

A second shaft connected to the first shaft, wherein the second disk is connected to the second shaft and the first disk is directly connected to the first shaft.

The heat exchanger is downstream of the first disk and the second disk and upstream of the combustor.

The heat exchanger accepts compressor exit airflow and turbine exit airflow.

The heat exchanger directs compressor exit airflow to the combustor and directs turbine exit airflow to an exhaust nozzle.

A row of turbine vanes forward of the first disk.

A row of turbine vanes forward of the second disk.

A gas turbine engine includes a rotatable first shaft; a compressor section forming an innermost section; a combustor section forming an outermost section; a turbine section forming an intermediate section, the compressor section, the combustor section, and the turbine section being concentric sections surrounding the first shaft; and a heat exchanger connected to an aft end of the combustor section; wherein airflow moves through the compressor section forward to aft of the gas turbine engine to the heat exchanger, moves radially outward through the heat exchanger to the combustor section, moves through the combustor section aft to forward of the gas turbine engine, and moves through the turbine section and the heat exchanger forward to aft of the gas turbine engine.

The gas turbine engine of the preceding paragraph can optionally include, additionally and/or alternatively, any one or more of the following features, configurations and/or additional components:

The compressor section includes a row of low pressure compressor blades, a row of compressor vanes, a row of high pressure compressor blades, a row of compressor vanes, a row of high pressure compressor blades, a row of compressor vanes, and a row of high pressure compressor blades.

The turbine section includes a first row of turbine vanes, a row of high pressure turbine blades, an inter-turbine strut, a second row of turbine vanes, and a row of low pressure turbine blades.

A first disk connected to the rotatable first shaft includes the row of low pressure compressor blades and the row of high pressure turbine blades, the row of high pressure turbine blades connected to a radially outer end of the row of low pressure compressor blades.

A second disk connected to the rotatable first shaft includes the row of high pressure compressor blades and the row of low pressure turbine blades, the row of low pressure turbine blades connected to a radially outer end of the row of high pressure compressor blades.

A third disk connected to the rotatable first shaft includes the first row of high pressure compressor blades.

A fourth disk connected to the rotatable first shaft includes the second row of high pressure compressor blades.

The second disk, the third disk, and the fourth disk are connected to the rotatable first shaft via a second shaft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a rotatable first shaft;
   a first disk connected to the first shaft, the first disk including:
      a row of low pressure compressor blades; and
      a row of high pressure turbine blades connected to a radially outer end of the row of low pressure compressor blades;
   a second disk connected to the first shaft, the second disk including:
      a first row of high pressure compressor blades; and
      a row of low pressure turbine blades connected to a radially outer end of the row of high pressure compressor blades;
   a third disk connected to the first shaft between the first disk and the second disk, the third disk including a second row of high pressure compressor blades;
   a first row of compressor vanes between the first disk and the third disk;
   a fourth disk connected to the first shaft between the third disk and the second disk, the fourth disk including a third row of high pressure compressor blades;
   a second row of compressor vanes between the third disk and the fourth disk;
   a third row of compressor vanes between the fourth disk and the second disk such that the first row of compressor vanes, the second row of high pressure compressor blades, the third row of high pressure compressor blades, the second row of compressor vanes, and the third row of compressor vanes are between the row of low pressure compressor blades and the first row of high pressure compressor blades;
   wherein the row of low pressure compressor blades is at a lowest pressure upstream end of a compressor section and the first row of high pressure compressor blades is at a highest pressure downstream end of the compressor section;
   a combustor radially outward from the first disk and the second disk; and
   a heat exchanger connected to the combustor aft of the second disk.

2. The gas turbine engine of claim 1, further including a second shaft connected to the first shaft, wherein the second disk is connected to the second shaft and the first disk is directly connected to the first shaft.

3. The gas turbine engine of claim 1, wherein the heat exchanger is downstream of the first disk and the second disk and upstream of the combustor.

4. The gas turbine engine of claim 1, wherein the heat exchanger accepts compressor exit airflow and turbine exit airflow.

5. The gas turbine engine of claim 1, wherein the heat exchanger directs compressor exit airflow to the combustor and directs turbine exit airflow to an exhaust nozzle.

6. The gas turbine engine of claim 1, further including a row of turbine vanes forward of the first disk.

7. The gas turbine engine of claim 1, further including a row of turbine vanes forward of the second disk.

8. A gas turbine engine comprising:
   a rotatable first shaft;
   a compressor section forming an innermost section, the compressor section comprising:
      a row of low pressure compressor blades;
      a first row of compressor vanes;
      a first row of high pressure compressor blades;
      a second row of compressor vanes;
      a second row of high pressure compressor blades;
      a third row of compressor vanes; and
      a third row of high pressure compressor blades;
   a combustor section forming an outermost section;
   a turbine section forming an intermediate section, the compressor section, the combustor section, and the turbine section being concentric sections surrounding the first shaft, the turbine section comprising:
      a first row of turbine vanes;
      a row of high pressure turbine blades;
      an inter-turbine strut;
      a second row of turbine vanes; and
      a row of low pressure turbine blades; and
   a heat exchanger connected to an aft end of the combustor section;
   wherein airflow moves through the compressor section forward to aft of the gas turbine engine to the heat exchanger, moves radially outward through the heat exchanger to the combustor section, moves through the combustor section aft to forward of the gas turbine engine, and moves through the turbine section and the heat exchanger forward to aft of the gas turbine engine; and
   wherein a first disk connected to the rotatable first shaft includes the row of low pressure compressor blades and the row of high pressure turbine blades, the row of high pressure turbine blades connected to a radially outer end of the row of low pressure compressor blades, a second disk connected to the rotatable first shaft includes the third row of high pressure compressor blades and the row of low pressure turbine blades, the row of low pressure turbine blades connected to a radially outer end of the third row of high pressure compressor blades, a third disk connected to the rotatable first shaft includes the first row of high pressure compressor blades, and a fourth disk connected to the rotatable first shaft includes the second row of high pressure compressor blades such that the first row of compressor vanes, the first row of high pressure compressor blades, the second row of high pressure compressor blades, the second row of compressor vanes, and the third row of compressor vanes are between the row of low pressure compressor blades and the third row of high pressure compressor blades; and wherein the row of low pressure compressor blades is at a lowest pressure upstream end of the compressor section and the third row of high pressure compressor blades is at a highest pressure downstream end of the compressor section.

9. The gas turbine engine of claim 8, wherein the second disk, the third disk, and the fourth disk are connected to the rotatable first shaft via a second shaft.

* * * * *